(12) United States Patent
Chun et al.

(10) Patent No.: US 7,675,870 B2
(45) Date of Patent: Mar. 9, 2010

(54) IP-TV BROADCASTING SERVICE SYSTEM AND METHOD USING PHYSICAL LAYER'S MULTICAST SWITCH

(75) Inventors: Kyung Gyu Chun, Daejeon (KR); Soon Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 391 days.

(21) Appl. No.: 11/678,648

(22) Filed: Feb. 26, 2007

(65) Prior Publication Data

US 2008/0080499 A1    Apr. 3, 2008

(30) Foreign Application Priority Data

Sep. 29, 2006    (KR)    .................. 10-2006-0096458

(51) Int. Cl.
    *H04L 12/28*    (2006.01)
(52) U.S. Cl. .................. 370/255; 370/388; 370/466
(58) Field of Classification Search .................. 370/222, 370/254, 466, 467, 389, 255
    See application file for complete search history.

(56) References Cited

U.S. PATENT DOCUMENTS

| 7,035,203 | B2 | 4/2006 | Licata et al. | |
|---|---|---|---|---|
| 7,385,918 | B2* | 6/2008 | Takagi | 370/222 |
| 2002/0176450 | A1* | 11/2002 | Kong et al. | 370/539 |
| 2005/0068914 | A1* | 3/2005 | Lee et al. | 370/312 |
| 2005/0158047 | A1 | 7/2005 | Way et al. | |
| 2006/0018324 | A1* | 1/2006 | Nisar et al. | 370/395.51 |
| 2006/0126641 | A1* | 6/2006 | Song et al. | 370/395.51 |

FOREIGN PATENT DOCUMENTS

| KR | 1020030038440 | 5/2003 |
|---|---|---|
| KR | 1020040037163 | 5/2004 |
| KR | 1020050043176 | 5/2005 |
| KR | 1020050081409 | 8/2005 |

OTHER PUBLICATIONS

Ahuja et al, Minimizing the differential delay for virtually concatenated Ethernet over SONET systems, Oct. 11, 2004, pp. 205-210.*
Ahuja et al, Optimal path selection for Ethernet over SONET under inaccurate link-state information, Oct. 3, 2005, pp. 88-96, vol. 1.*
Korean Notice of Patent Grant dated Jan. 24, 2008 for the corresponding application KR 10-2006-0096458.

* cited by examiner

*Primary Examiner*—Ayaz R Sheikh
*Assistant Examiner*—Mounir Moutaouakil
(74) *Attorney, Agent, or Firm*—Ladas & Parry LLP

(57) ABSTRACT

An Internet Protocol Television (IP-TV) broadcasting service system and method using a physical layer multicast switch are provided. The system comprises: a head end which converts an Ethernet signal to a virtual concatenation group (VCG) signal of a synchronous digital hierarchy/synchronous optical network (SDH/SONET); a multicast switch which multicasts the VCG signal in a physical layer; and a tail end which receives the multicasted VCG signal through a Synchronous Transmission Module level n (STM-N) optical link and restores the VCG signal to the Ethernet signal. Therefore, high quality TV broadcasting can be provided in an IP multicast network.

8 Claims, 8 Drawing Sheets

IP-TV BROADCASTING SERVICE SYSTEM AND METHOD USING PHYSICAL LAYER'S MULTICAST SWITCH

CROSS-REFERENCE TO RELATED PATENT APPLICATIONS

This application claims the priority of Korean Patent Application No. 10-2006-0096458, filed on Sep. 29, 2006, in the Korean Intellectual Property Office, the disclosure of which is incorporated herein in its entirety by reference.

BACKGROUND OF THE INVENTION

1. Field of the Invention

The present invention relates to an Internet Protocol Television (IP-TV) broadcasting service, and more particularly, to an IP-TV broadcasting service system and method using a multicast switch of a physical layer.

2. Description of the Related Art

The conventional multicasting function is used in an IP network. Since multicasting is performed in a single channel in the IP network, a multi-protocol label switched protocol (MPLS) technology should be used to multicast signals bundled in a plurality of channels, but it is difficult to implement the technology using existing methods.

Moreover, a protocol used for controlling multicasting is complicated, and delay, jitter, and packet loss in visual signals must be minimized in order to ensure high quality.

SUMMARY OF THE INVENTION

The present invention provides an Internet Protocol Television (IP-TV) broadcasting service system and method using a multicast switch of a physical layer, which multicasts signals bundled in a plurality of channels to an intended location without delay, jitter, or packet loss.

According to an aspect of the present invention, there is provided An IT-TV (Internet Protocol Television) broadcasting service system using a physical layer multicast switch, the system comprising: a head end which converts an Ethernet signal to a virtual concatenation group (VCG) signal of a SDH/SONET (synchronous digital hierarchy/synchronous optical network); a multicast switch which multicasts the VCG signal in a physical layer; and a tail end which receives the multicasted VCG signal through an STM-N (Synchronous Transmission Module level n) optical link and restores the VCG signal to the Ethernet signal.

According to another aspect of the present invention, there is provided An IP-TV broadcasting service method using a physical layer multicast switch, the method comprising: converting an Ethernet signal to a VCG signal of SDH/SONET using a head end; multicasting the VCG signal in a physical layer and transmitting the VCG signal to an STM-N optical link using the multicast switch; and restoring the multicasted VCG signal to the Ethernet signal using a tail end.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
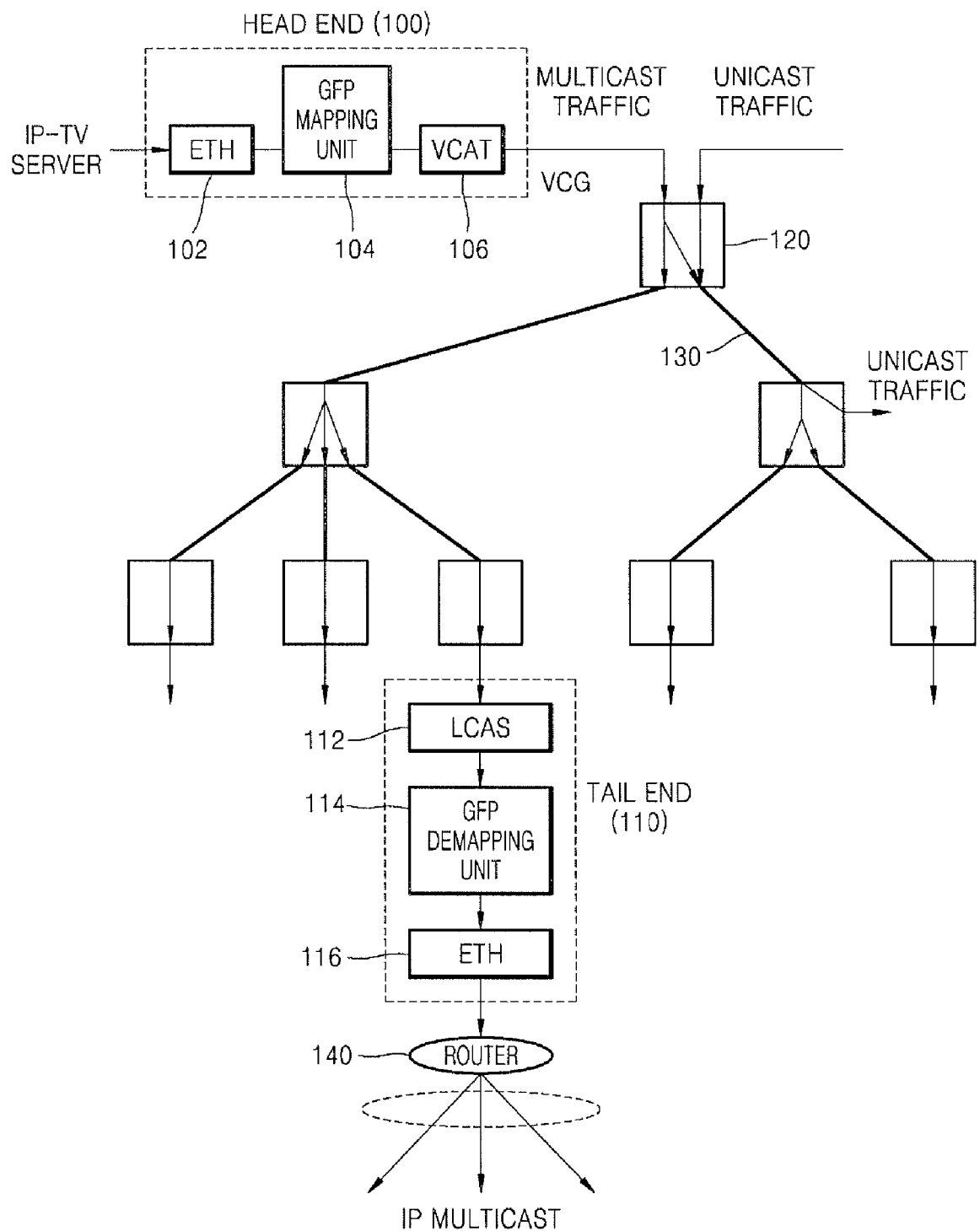
FIG. 1 is a configuration diagram of an Internet Protocol Television (IP-TV) service system network using a multicast switch of a physical layer according to an embodiment of the present invention.

FIG. 1 is a configuration diagram of an Internet Protocol Television (IP-TV) service system network using a multicast switch of a physical layer according to an embodiment of the present invention. Referring to FIG. 1, the IP-TV service system network includes a head end 100, a tail end 110, and a multicast switch 120.

In order to transmit an Ethernet signal from an IP-TV server to a synchronous digital hierarchy/synchronous optical network (SDH/SONET), the head end 100 includes an Ethernet MAC (ETH) 102 that receives the Ethernet signal, a generic framing procedure mapping unit 104 that maps the Ethernet signal using a generic framing procedure (GFP), and virtual concatenation (VCAT) 106 that outputs a virtual concatenation group (VCG) signal which has been allocated based on a demand bandwidth of the Ethernet signal.

The multicast switch 120 multicasts the VCG signal, and a Synchronous Transmission Module level n (STM-N) optical link 130 converts signal formats from/to electrical to/from optical after multiplexing/demultiplexing the signals. The multicast switch 120 also functions as a unicast switch, and in this case, the STM-N optical line 130 transfers a unicast signal.

The tail end 110 includes a link capacity adjustment scheme (LCAS) 112 that restores the VCG to its original condition in order to extract an IP multicasting signal, a GFP demapping unit 114 that performs demapping in order to extract the Ethernet signal from the restored signal, and an ETH 116 that is in charge of an Ethernet interface. The tail end 110 provides IP-TV broadcasting by means of a router 140 which is enabled to perform IP multicasting using the Ethernet interface.

Figure 2:
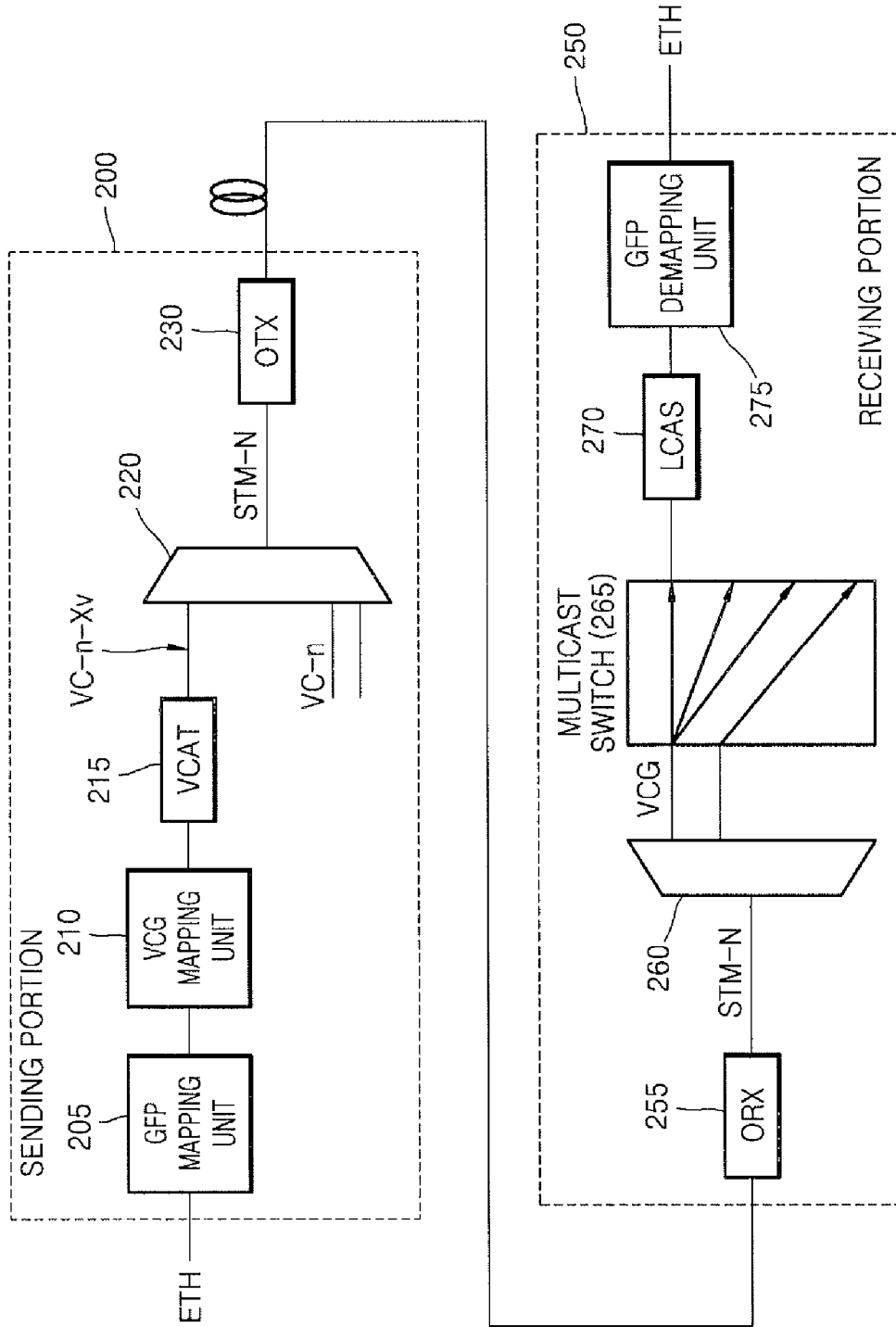
FIG. 2 is a configuration diagram of a Synchronous Transmission Module level n (STM-N) device for using a multicast switch of a physical layer according to an embodiment of the present invention.

FIG. 2 is a configuration diagram of an STM-N device for using a multicast switch of a physical layer according to an embodiment of the present invention. Referring to FIG. 2, the STM-N device includes a sending portion 200 and a receiving portion 250 which are connected through optical fiber. The sending portion 200 includes a GFP mapping unit 205, a VCG mapping unit 210, a VCAT 215, a multiplexer 220, and an optical transmitter (OTX) 230, and the receiving portion 250 includes an optical receiver (ORX) 255, a demultiplexer 260, a multicast switch 265, a Link Capacity Adjustment Scheme (LCAS) 270, and a GFP demapping unit 275.

In the sending portion 250, the GFP mapping unit 205 maps the Ethernet signal to a GFP, the VCG mapping unit 210 sets a physical bandwidth based on a demand bandwidth of the Ethernet signal, the VCAT 215 divides the VCG signal into a VC-n (virtual container, where n=1, 2, 3, 4, . . . ) which is a minimum unit of the STM-N. Then, the multiplexer 220 multiplexes an output signal of the VCAT 215 and VC-n signals of another VCAT, and the OTX 230 converts the multiplexed signals into optical signals in order that digital signals can be transferred through the optical fiber.

In the receiving portion 250, the ORX 255 converts the received optical signal into a digital signal, the demultiplexer 260 demultiplexes the STM-N signal which is converted into a digital signal and extracts a VCAT signal from the STM-N signal. The multicast switch 265 multicasts the VCAT signal, the LCAS 270 reassembles the VC-n signals which has been divided by the VCAT to the VCG, and the GFP demapping unit 275 extracts the Ethernet signal from the LCAS 270.

Figure 3:
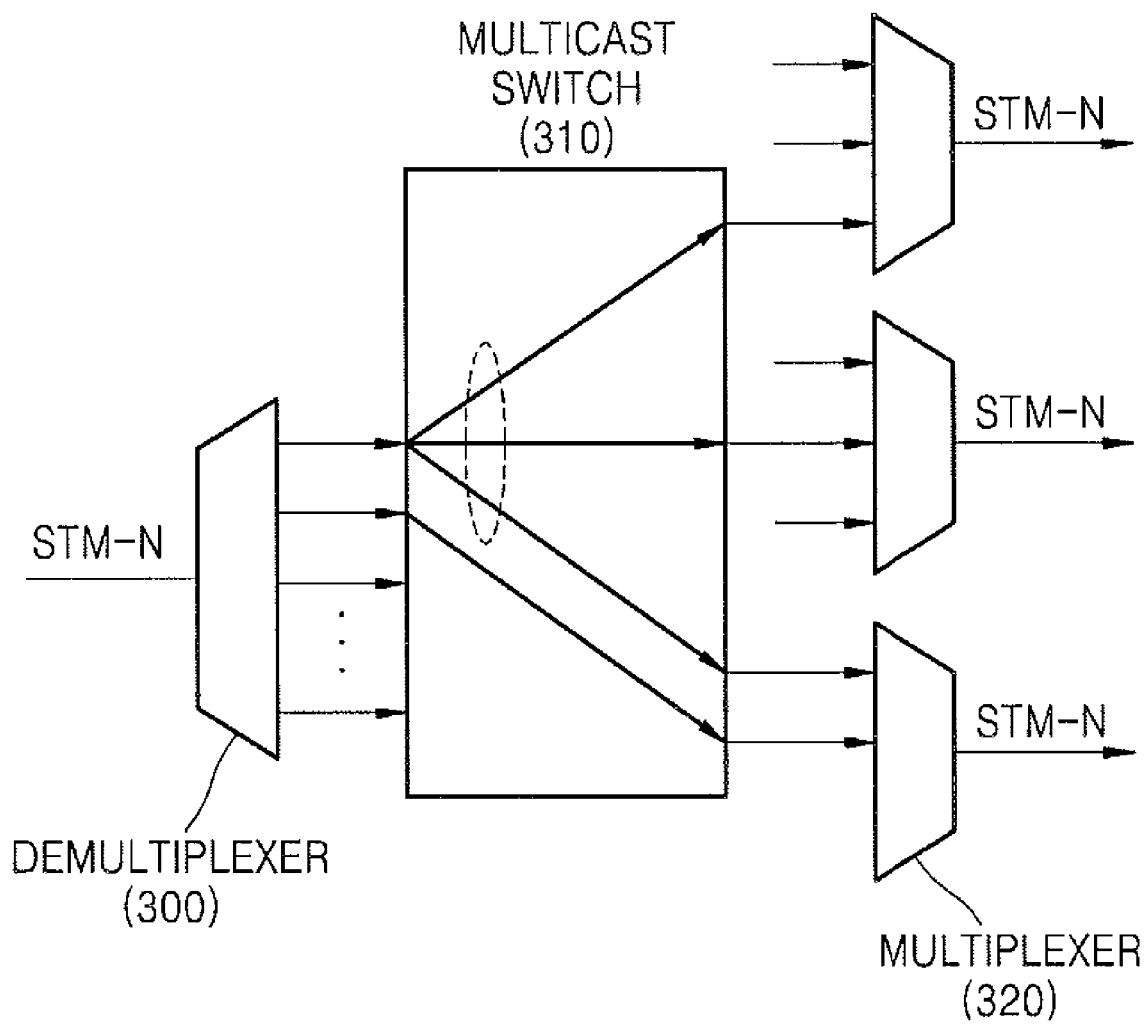
FIG. 3 is a configuration diagram of an STM-N device for receiving multicast signals and unicast signals at the same time according to an embodiment of the present invention.

FIG. 3 is a configuration diagram of an STM-N device for receiving multicast signals and unicast signals at the same time according to an embodiment of the present invention. Referring to FIG. 3, in order to multicast received multicast signals to another link, a demultiplexer 300 extracts the multicast signals from received STM-N signals, the multicast switch 310 transmits the extracted multicast signals to the multiplexer 320, and the multiplexer 320 multicasts the signals again and transmits them to an intended link. At this time, the multicast switch 310 can multiplex and transmit the multicast signals and the unicast signals as well as just only transmitting the multicast signals.

Figure 4:
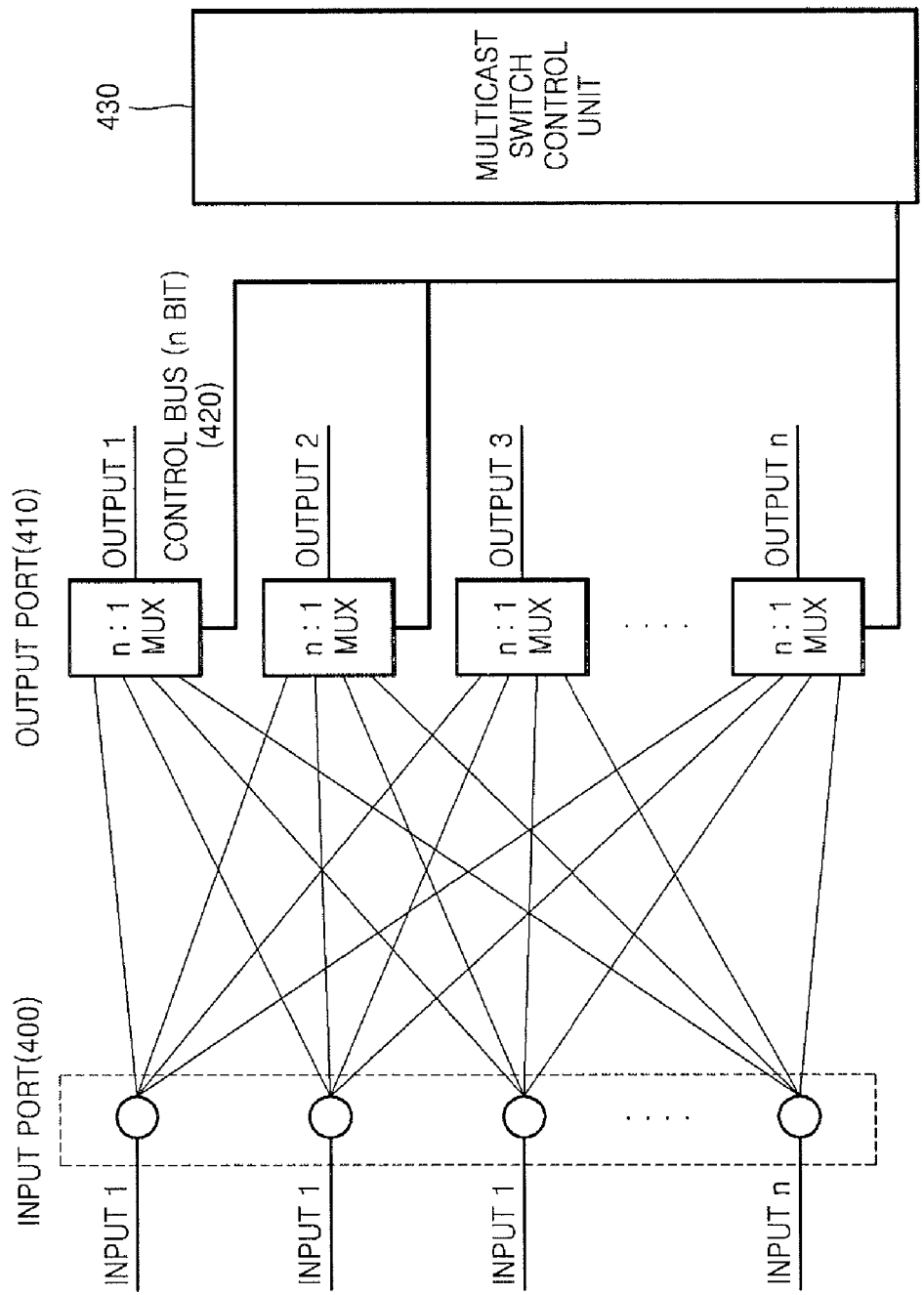
FIG. 4 is a configuration diagram of the inside of a multicast switch of a physical layer according to an embodiment of the present invention.

FIG. 4 is a configuration diagram of the inside of a multicast switch of a physical layer according to an embodiment of the present invention. Referring to FIG. 4, the structure of the multicast switch of the physical layer allows arbitrary input signals to be output to any intended port. Input ports 410 are fanned out in the ratio of 1:n so as to be connected to all the output ports 410. Also, each of the output ports is designed to multiplex the signals in the ratio of n:1 in order to select only one signal among n input signals.

A multicast switch control unit 430 controls each of the output ports to select a single intended input signal. Specifically, the multicast switch control unit 430 is connected to each output port through a control bus 420 and controls the output ports. The control bus 420 is formed so as to process n bits, n denoting the number of the input ports.

Figure 5:
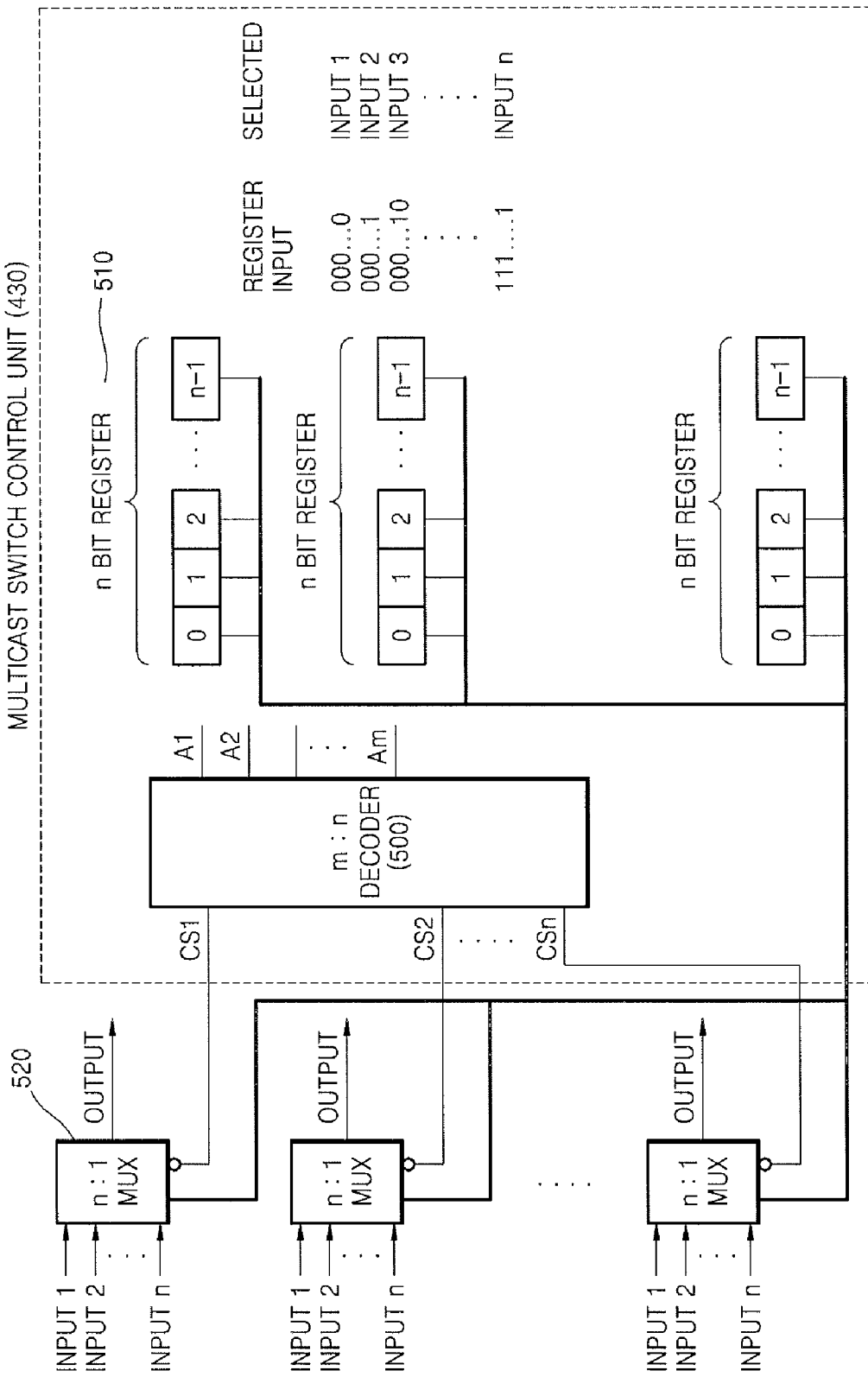
FIG. 5 is a configuration diagram of a multicast switch control unit illustrated in FIG. 4, which controls the multicast switch.

FIG. 5 is a configuration diagram of the multicast switch control unit 430 illustrated in FIG. 4, which controls the multicast switch. Referring to FIG. 5, an m:n decoder 500 is enabled to select the output port in order to control the output ports that is composed of multiplexers n:1 Mux, and registers 510 each of which is composed of n bits enabling the intentionally selected output port to select an intended input signal.

The m:n decoder 500 allows a certain n:1 Mux to be chosen by enabling one of CS1 through CSn signals, which are the output signals from the m:n decoder 500, on input addresses A1 through Am. The output port 520, which has already been chosen, should be latched and its enabling status should not be changed as long as additional control is not applied.

The output ports are enabled to output an intended input signal for the selected n:1 mux to select the intended input signal by selecting an input 1 when the value of the n bit register 510 is 000 . . . 00 or selecting an input 2 when the value of the n bit register 510 is 000 . . . 01.

In the case of multicast signals, multicasting can be easily performed by selecting a single multicast signal, which is intended to be multicasted, from the port.

Figure 6:
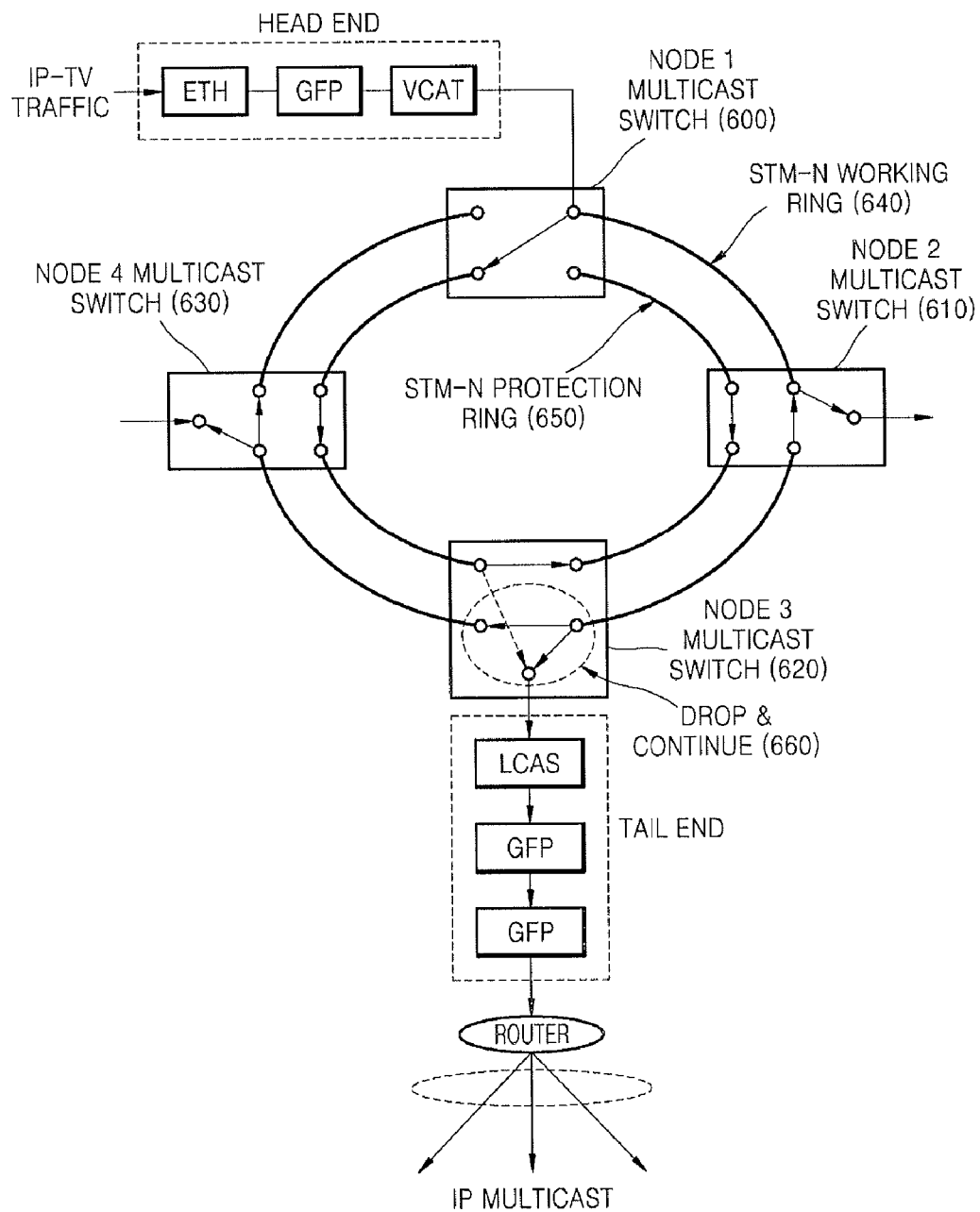
FIG. 6 is a configuration diagram of an IP-TV service network in which a multicast switch is adapted to a unidirectional path switched ring (UPSR) network according to an embodiment of the present invention.

FIG. 6 is a configuration diagram of an IP-TV service network in which a multicast switch is adapted to a unidirectional path switched ring (UPSR) network according to an embodiment of the present invention. Referring to FIG. 6, the multicast switches 600, 610, 620, and 630 are employed by the UPSR network so that self-healing for multicast signals is possible using a Drop and Continue method even when errors such as cable cut-off occur in the network.

The structures of a head end and a tail end are the same as those illustrated in FIG. 1, and therefore a detailed description thereof will be omitted.

A node 1 multicast switch 600 enables signals to be bridged between an STM-N working ring 640 and an STM-N protection ring 650.

A node 3 multicast switch 620 performs a Drop and Continue function so as to simultaneously drop signals and transmit the same signals to a node 4 multicast switch 630 that is the next node.

Figure 7:
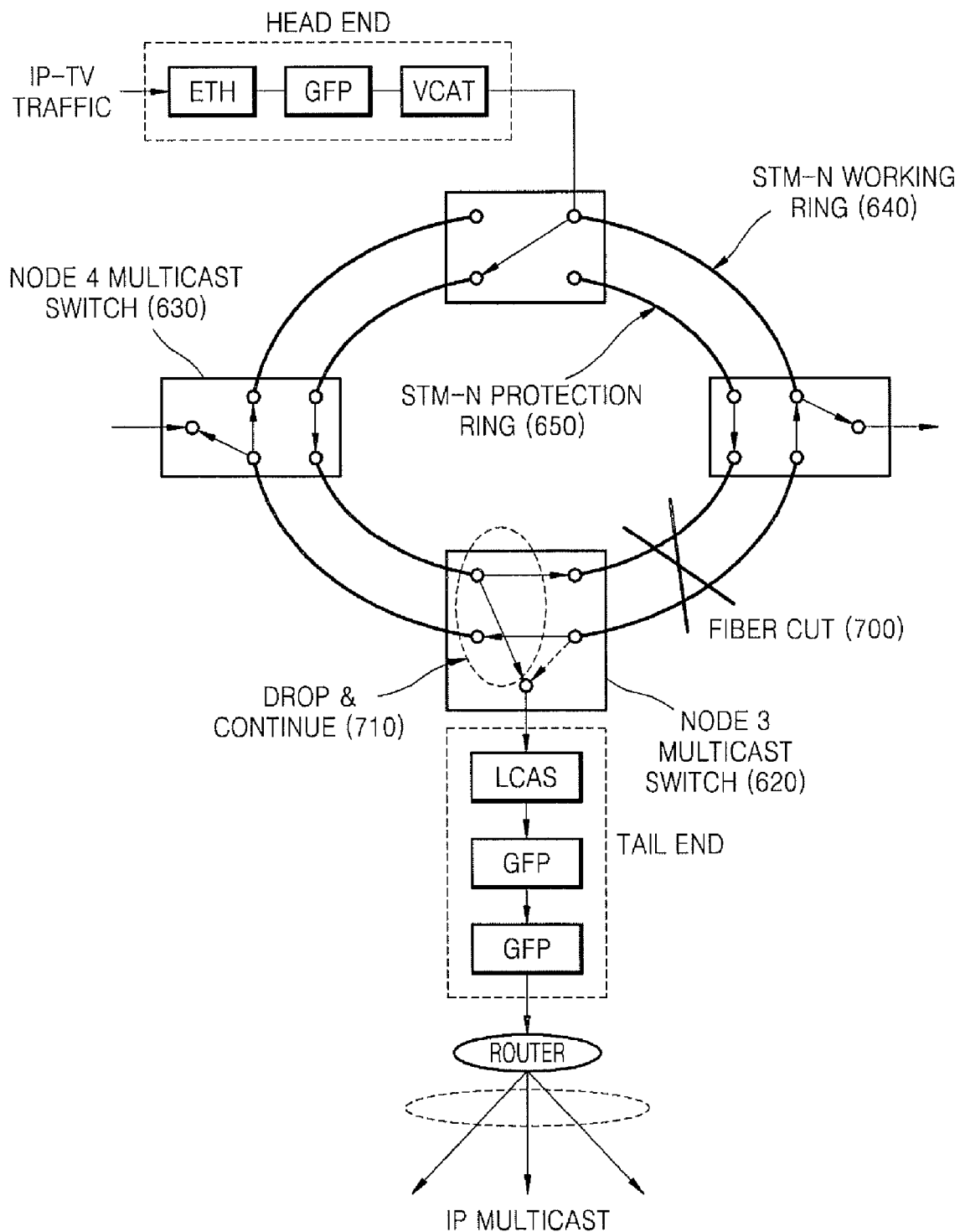
FIG. 7 is a configuration diagram of the IP-TV service network illustrated in FIG. 6 in which a self healing function is performed when an error occurs in the UPSR network.

FIG. 7 is a configuration diagram of the IP-TV service network illustrated in FIG. 6 in which a self healing function is performed when an error occurs in the UPSR network. Referring to FIG. 7, when there is an error such as an optical fiber cut in the UPSR network, since the node 3 multicast switch 620 cannot receive signals from the STM-N working ring 640 any longer, the node 4 multicast switch 630 drops and continues signals received from the STM-N protection ring 650.

At the same time, the node 3 multicast switch 620 disables a drop signal from the STM-N working ring 640 to prevent congestion of signals dropped by the STM-N working ring 640 and protection ring 650 even when the error is recovered.

Figure 8:
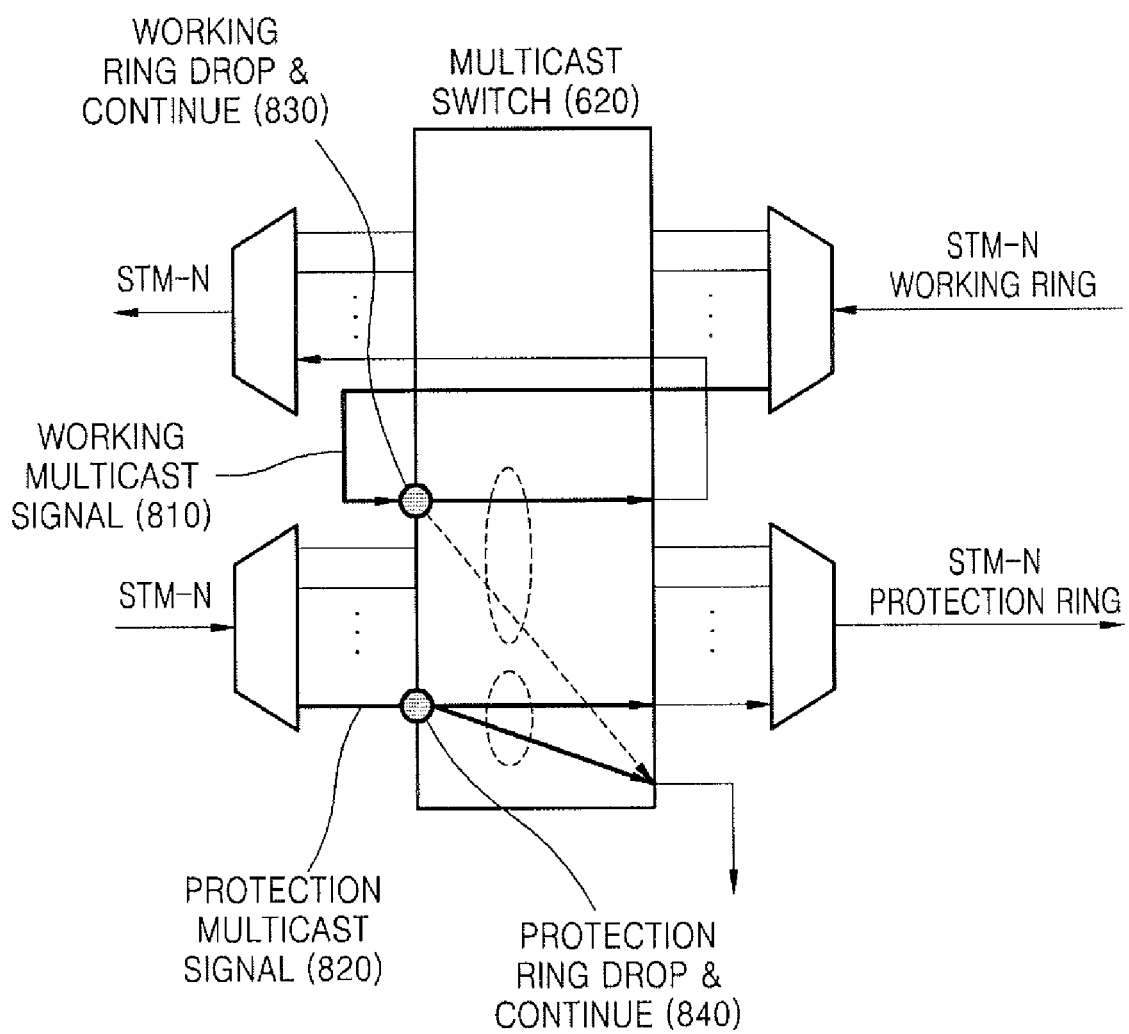
FIG. 8 is a functional block diagram of the multicast switch illustrated in FIG. 7 when the error occurs in the UPSR illustrated in FIG. 7.

FIG. 8 is a functional block diagram of the multicast switch 620 illustrated in FIG. 7 when the error occurs in the UPSR illustrated in FIG. 7. Referring to FIG. 8, a working multicast signal 810 and a protection multicast signal 820 are arranged as shown in FIG. 8 in order that the signals can be dropped at the same port.

During normal operation, a working ring Drop and Continue signal 830 is dropped and continued and the protection ring Drop and Continue signal 840 is not dropped but instead bypassed to the next node, thus preventing signal congestion. However, when an error occurs in the network, the Working ring Drop and Continue and the Protection ring Drop and Continue are operated in reverse, enabling self-healing.

According to the present invention, an IP multicast network uses a multicast switch of a physical layer (layer 1), and thus it is possible to provide high-resolution image signals, simplify the structure of a network, provide a highly reliable network, and copy bundled image signals on a massive scale. In addition, by using a multicast switch of a physical layer in a UPSR network, self-healing is possible and thus network reliability of 99.999% of an SDH/SONET device can be guaranteed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An IP-TV (Internet Protocol Television) broadcasting service system using a physical layer multicast switch, the system comprising:

a head-end which converts an Ethernet signal to a virtual concatenation group (VCG) signal comprising n virtual concatenated (VC-n) signals of a SDH/SONET (synchronous digital hierarchy/synchronous optical network);

a multicast switch which multicasts the VCG signal in a physical layer, wherein the multicast switch includes:

n input ports receiving the VC-n signals;

n multiplexer output ports coupled to the input ports such that the multiplexer output ports are enabled to output selectively chosen VC-n signals;

an n-bit register coupled to the multiplexer output ports that sends a register value signal to the multiplexer output ports to output the selectively chosen VC-n signals; and a decoder coupled to multiplexer output ports and coupled to the n-bit register that controls the selection of the chosen VC-n signals from the multiplexer output ports from the decoder on m-input addresses A1 through Am; and a tail-end which receives the multicasted VCG signal through an STM-N (Synchronous Transmission Module level n) optical link and restores the VCG signal to the Ethernet signal.

2. The system of claim 1, wherein the head end includes a generic framing procedure (GFP) mapping unit which maps the Ethernet signal using GFP, and virtual concatenation (VCAT) which divides the VCG to which a demand bandwidth of the Ethernet signal is allocated into a minimum signal unit of an STM-N.

3. The system of claim 1, wherein the tail-end includes a link capacity adjustment scheme (LCAS) which reassembles the signal received through the STM-N optical link to the VCG signal, and a GFP demapping unit which demaps the restored VCG signal using GFP and extracts the Ethernet signal from the demapped VCG signal.

4. The system of claim 1, wherein the multicast switch includes a working ring Drop and Continue signal and a protection ring Drop and Continue signal for use inn reversing operations and enabling self-healing.

5. The system of claim 1, wherein the multicast switch transmits a signal in a unidirectional path switched ring (UPSR) network using a Drop and Continue method.

6. The system of claim 1, wherein the multicast switch bridges the VCG signal between an STM-N working ring and an STM-N protection ring in the UPSR network.

7. An IP-TV broadcasting service method using a physical layer multicast switch, the method comprising:

converting an Ethernet signal to a VCG signal of SDH/SONET using a head end;

multicasting the VCG signal in a physical layer and transmitting the VCG signal to an STM-N optical link using the multicast switch wherein the multicast switch includes:

n input ports receiving the VC-n signals;

n multiplexer output ports coupled to the input ports such that the multiplexer output ports are enabled to output selectively chosen VC-n signals;

an n-bit register coupled to the multiplexer output ports that sends a register value signal to the multiplexer output ports to output the selectively chosen VC-n signals; and a decoder coupled to multiplexer output ports and coupled to the n-bit register that controls the selection of the chosen VC-n signals from the multiplexer output Ports from the decoder on m-input addresses A1 through Am; and reassembling the multicasted VCG signal to the Ethernet signal using a tail end.

8. The method of claim 7, further comprising:

transmitting the VCG signal using a Drop and Continue method in a UPSR network using the multicast switch.

* * * * *